F. R. JONES & A. BUENZLI.
LOCKING AND TILTING DEVICE.
APPLICATION FILED SEPT. 13, 1912.

1,084,089.

Patented Jan. 13, 1914.
7 SHEETS—SHEET 1.

WITNESSES

INVENTORS

F. R. JONES & A. BUENZLI.
LOCKING AND TILTING DEVICE.
APPLICATION FILED SEPT. 13, 1912.

1,084,089.

Patented Jan. 13, 1914.

WITNESSES

INVENTORS

UNITED STATES PATENT OFFICE.

FORREST R. JONES AND ADOLPH BUENZLI, OF KNOXVILLE, TENNESSEE.

LOCKING AND TILTING DEVICE.

1,084,089. Specification of Letters Patent. Patented Jan. 13, 1914.

Application filed September 13, 1912. Serial No. 720,197.

*To all whom it may concern:*

Be it known that we, FORREST R. JONES and ADOLPH BUENZLI, citizens of the United States, residing at Knoxville, in the county of Knox and State of Tennessee, have invented new and useful Improvements in Locking and Tilting Devices, of which the following is a specification.

This invention relates more especially to the use of locking devices applied to dump-cars whose bodies are tilted by power for dumping the load.

The object is to provide devices which, in the form for tilting the load-carrying body in either of two directions at the will of the operator, will automatically unlock, tilt, upright and again lock the tiltable body in its load-carrying position, and which, in case of bent, distorted or otherwise injured members, will not exert undue stresses upon the members so as to break them, and in no case will leave the body in a tilted or dangerous position. In the form for tilting in one direction only, there are the same provisions relative to unlocking, tilting, locking and prevention of undue stresses, but the returning of the body to its load-carrying position is accomplished by means exterior to the devices of this invention, such as gravity or springs and this form has no safety device.

Figures 1, 2:
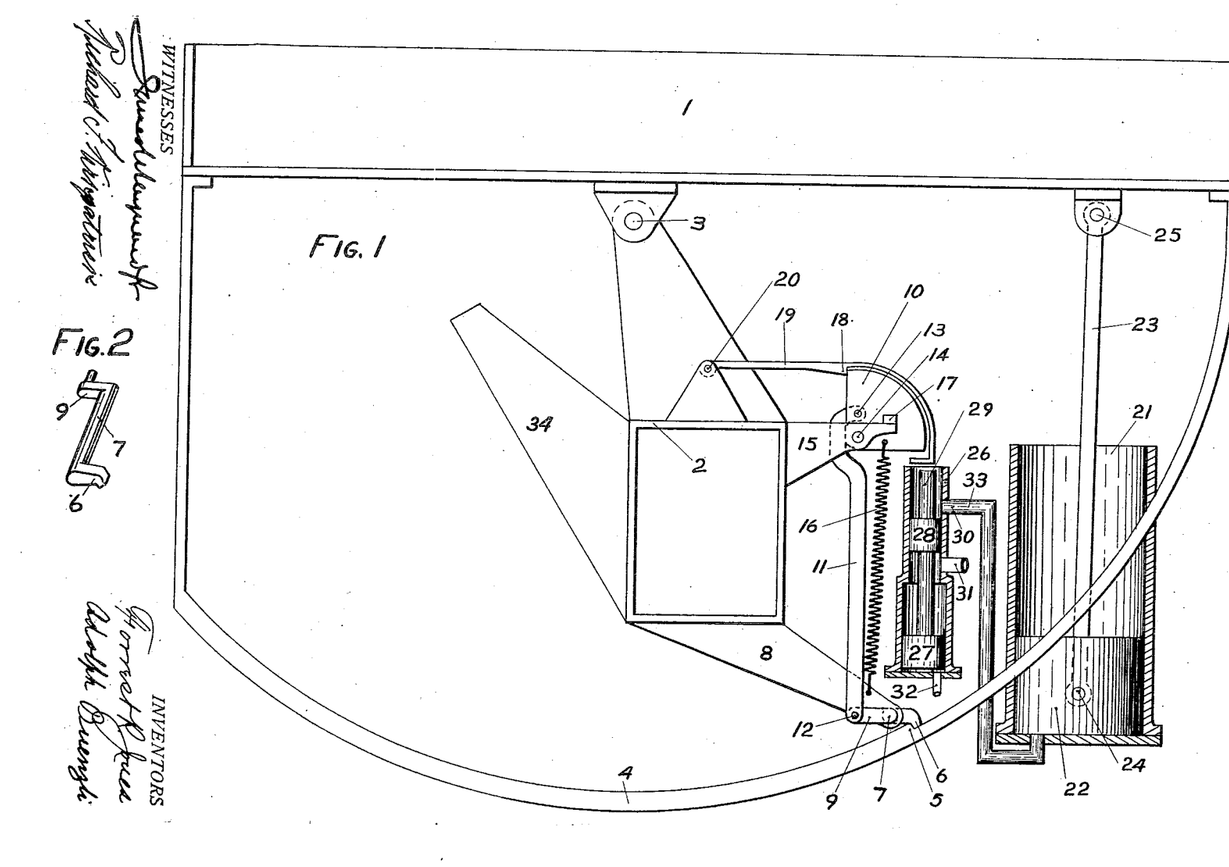
Figure 1 is partly end elevation and partly sectional, a portion of which shows an end elevation of the improved locking device and an axial section of a two-piston differential valve, both in the form applicable to a pneumatically operated load-carrying body tiltable in one direction only and without automatic means for lifting the side to allow the load to discharge. The other parts shown in this figure, which are of usual construction, are: a load-carrying body hinge-mounted on a bracket which extends upward from a supporting sill; the supporting sill; a pneumatic tilting, or dumping, cylinder, shown in axial section, together with its piston and the rod that connects the latter to the load-carrying body; a pipe connecting the differential valve casing to the tilting cylinder; and an arm extending outward from the sill so as to limit the tilting movement of the load-carrying body. The single-shouldered quadrant rigidly attached to the load-carrying body is one member of the locking device.
Fig. 2 is a perspective view of the dog-shaft and the attached crank-arm of the locking device shown in Fig. 1.
Figures 3, 5:
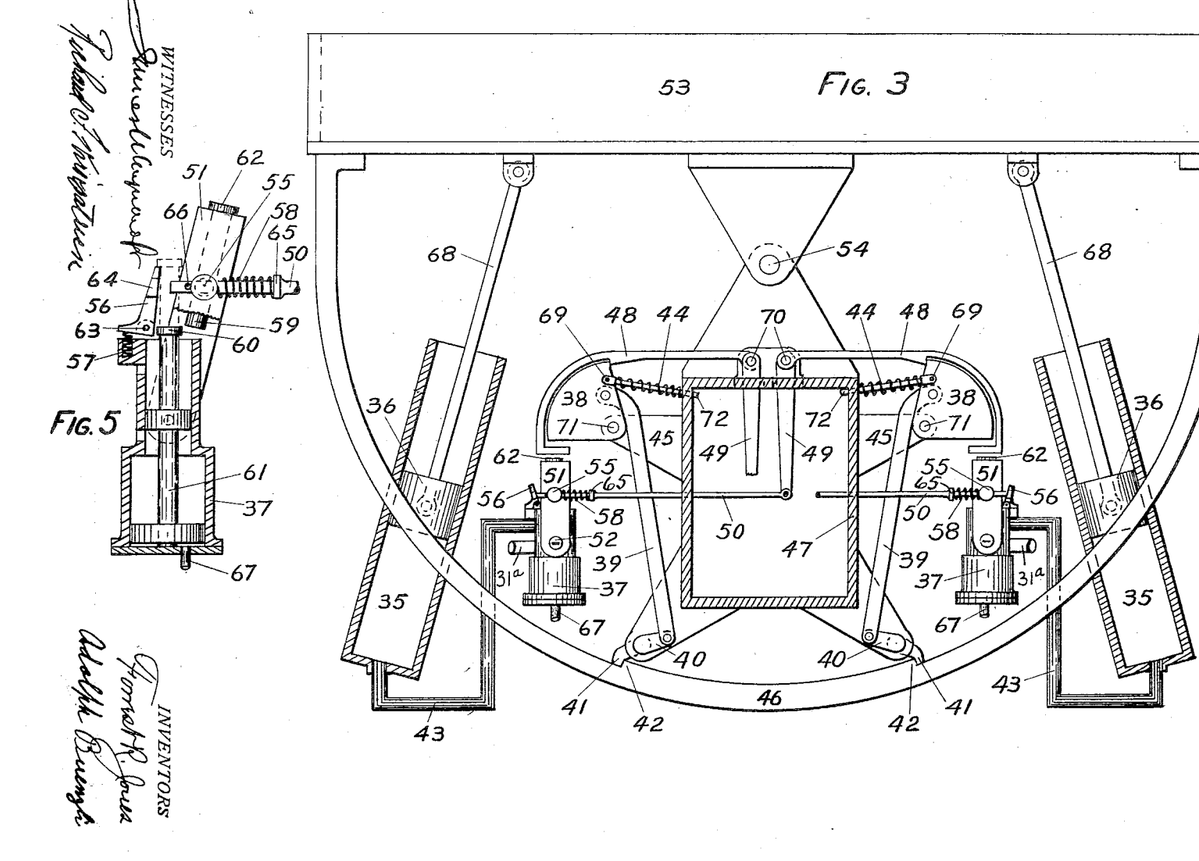
Figure 4:
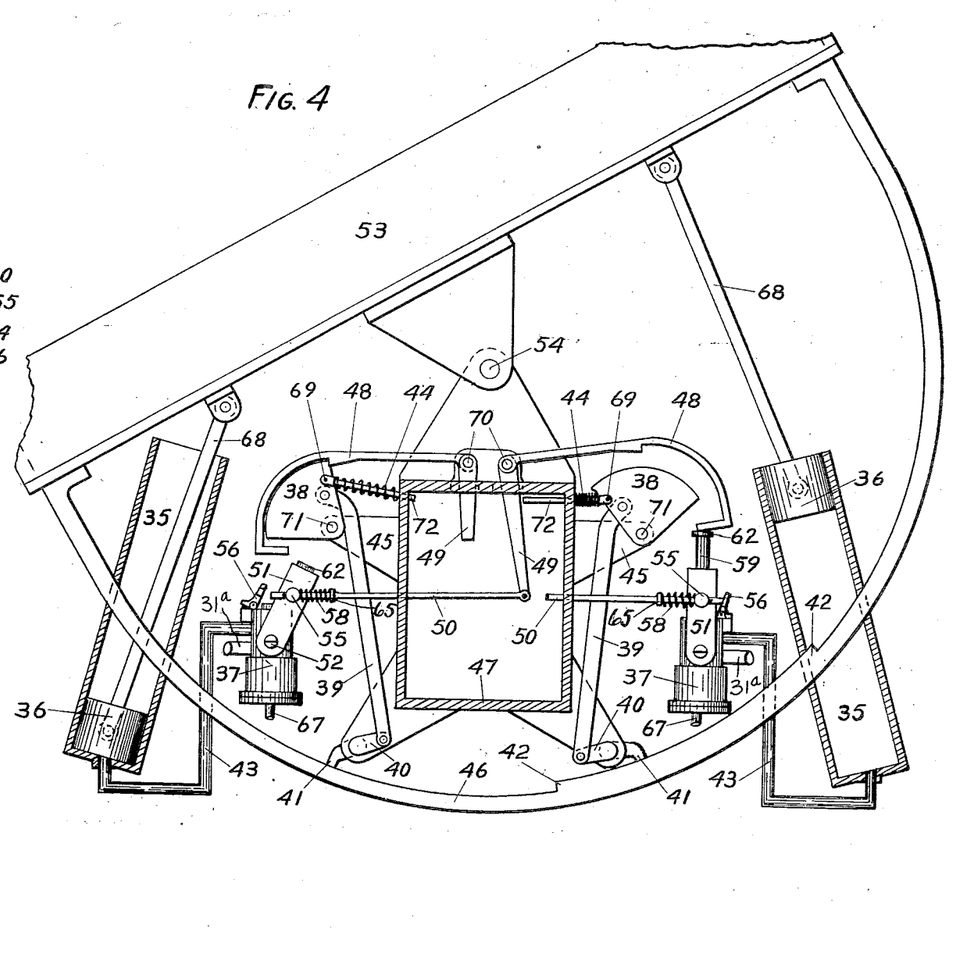
Fig. 4 is the same as Fig. 3 except that the body is shown tilted toward the left, and each of the other parts is in the position it occupies after tilting the body pneumatically with the right cylinder but before compressed air is cut off from the lower end of the right differential valve and before compressed air is admitted to the lower end of the left differential valve.
Figure 6:
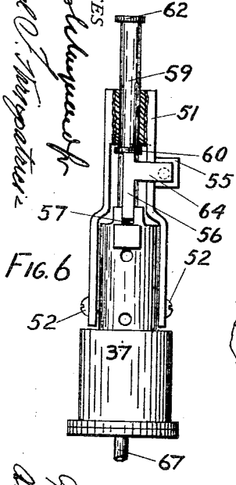
Fig. 6 is an enlarged side elevation of the differential valve of Figs. 3 and 4, together with the improved safety device and the withdrawable portion of the interlocking, or interconnecting, mechanism. The yoke is shown in its upright position, partly broken away to expose the push-pin that it carries at its top. The piston rod of the differential valve is shown in its uppermost position, and the push-pin is correspondingly lifted to its highest position, in which it is also shown at the right differential valve in Fig. 4.

In some forms of the improved devices the locking device acts directly upon the mechanism that lifts the movable sides of the load-carrying body (see Figs. 7, 8, and 9), but in connection with other forms of the device the load-carrying body may or may not have removable sides, and in case there are such sides the locking device operates independently of the mechanism for lifting the sides from the load-retaining position when dumping the load from the body (see Figs. 1, 3 and 4).

In order to make the drawings as clear and distinct as possible, the supports for the tilting, or dumping, cylinders, and for the adjacent valves used in conjunction with them, are omitted, but it is understood that these cylinders and valves are supported more or less rigidly relative to the parts of the complete device which do not move while the load-carrying body is being tilted and uprighted. The support may be either a bracket extending outward from the sill which supports the load-carrying body, or the truck of the car.

Fig. 3 is an end view, partly in section and partly in elevation, and with the lower end of one arm and the left end of the rod that connects to the arm broken off near the center of the figure in order to leave a clear view of the duplicates of these parts. This figure shows an end elevation of the improved locking device and of a modified form of the differential valve of Fig. 1, applied to a load-carrying body pneumatically tiltable toward either side at will and without automatic means for lifting the sides to allow the load to discharge. The differential valve and the locking parts of the improved device are shown in duplicate except the quadrant that is attached to the tiltable body and except the parts mentioned as broken away, together with improved mechanism in duplicate interconnecting the locking devices proper in such a manner that only one locking device is unlocked during the operation of tilting and uprighting the body, and with an improved safety device which prevents exhaust of compressed air from the cylinder which is used to upright the body until after the body has been uprighted and securely locked in its load-carrying position. The other parts shown in this figure are of usual form and of the same nature as in Fig. 1. They are: A tiltable load-carrying body hinge-mounted on a bracket extending upward from a supporting sill, the body and bracket shown in end elevation and the supporting sill in transverse section on a plane forward of the locking mechanism; pneumatic tilting cylinders in duplicate, shown in axial section, together with their pistons and the rods connecting these pistons respectively to the load-carrying body; and pipes connecting the tilting cylinders to the differential valves respectively. The quadrant, which is part of the locking mechanism, has two shoulders instead of only one as in Fig. 1. Fig. 5 is an enlarged detail drawing of the modified differential valve as used in Figs. 3 and 4, and of the improved safety device and the withdrawable portion of the interconnecting mechanism which corresponds to this valve. The casing of this valve is shown in axial section observed in the same direction as the left valve in Figs. 3 and 4. The lower part of the front arm of the yoke is broken away in order to expose the parts between the arms of the yoke. The position of the yoke in Fig. 5 corresponds to that which the left yoke occupies just after the load-carrying body has been tilted toward the left, as in Fig. 4, and the compressed air exhausted from the lower end of the right differential valve of Fig. 4.

In Fig. 1 the tiltable body 1 is supported by the hollow draft-sill 2, to which it is connected by the hinge-pin 3. For locking the body in the load-carrying position, the members 4 to 20 inclusive, are provided. The quadrant 4 is rigidly fastened to the body 1, and its center of curvature is coincident with the axis of the hinge-pin 3. This quadrant has a shoulder 5 with which the dog 6 of the dog-shaft 6—7—9 engages to hold the body 1 from tilting toward the left. The shaft 7 of this dog-shaft is rotatably supported by the bracket 8, which is an integral part of 2. The crank-arm 9 of this dog-shaft is connected to the wrist-plate 10 by means of the reach-rod 11, the crank-pin 12, and the wrist-pin 13. The wrist-plate 10 is mounted on a shaft 14 which is rotatably supported by the bracket 15, an integral part of sill 2. The tension spring 16 pulls on the wrist-plate to rotate it in a right-hand direction. This rotation is limited by the lug 17, on the wrist-plate, striking against the extension of the bracket 15, or by the reach-rod 11 coming into contact with that portion of the wrist-plate 10 which is near the shaft 14. The wrist-plate 10 is held in the position shown, with the stop 17 against the bracket 15, by means of the shoulder 18 on the latch 19 hinged to sill 2 by the pin 20. When the wrist-plate 10 is in the position last stated, the three pins, 12, 13 and 14, are in a straight line, the wrist-plate thus being in its dead-center position. Under this condition the pressure of the shoulder 5 against the bell-crank arm 6 has no tendency to rotate the wrist-plate 10.

The tilting cylinder 21 has a single-acting piston 22 that is connected to the body 1 by means of the connecting-rod 23, which is hinge-connected to both the piston and the body by means of the hinge-pins 24 and 25 respectively. The differential valve 26 has a large piston 27 in the lower part, and a small piston 28 in the upper part. These two pistons are rigidly connected together by the piston rod 29, which extends upward above the smaller piston. The differential valve casing has three ports, 30, 31, and 32. The upper port 30 is connected to the interior of the tilting cylinder 21 at the lower end of the latter, by means of a pipe, or a duct, 33. It is assumed that the differential valve casing 26, and the tilting cylinder 21, are rigidly supported by the draft-sill 2, but this supporting means has been omitted from the drawing in order to leave the latter as clear as possible.

When operating the device of Fig. 1, the middle port 31 of the differential valve is connected to some source of pneumatic or liquid pressure (not shown) and the bottom port 32 is connected, through a control valve or corresponding device, to the same or a similar source of pressure (not shown). For convenience of description it will be assumed that compressed air is used. When the control is set to admit compressed air through the port 32 to the lower end of the differential valve, then the differential pistons 27 and 28, and the piston rod 29, are forced upward. During the first stage of this upward movement, the upper end of the piston rod pushes against and lifts the free end of the latch 19, thus disengaging the shoulder 18 from the wrist-plate 10 before the hooked end of the latch comes into contact with the lower edge of the wrist-plate. The second stage of the upward movement of the differential valve pistons forces the free end of the latch 19 up against the wrist-plate 10 and then rocks the wrist-plate counter-clockwise around its shaft 14, thus moving the wrist-pin 13 out of line with the pins 12 and 14. This leaves the dog-shaft 6—7—9 free to be rotated by pressure of the shoulder 5 against the dog 6. The third stage of the upward movement of the differential pistons carries the upper piston above the port 30. The ports 30 and 31 then have connection inside of the valve casing, and compressed air passes through the port 31 into the smaller cylinder of the differential valve and out through the port 30 and pipe 33 into the bottom of the tilting cylinder 21, forcing the piston 22 upward and causing the body 1 to tilt. The bracket 34 stops the body from tilting farther than is desired.

When the air pressure is caused to decrease under the lower piston of the differential valve (on account of operating the control), the differential pistons and their rod descend to their lower position again, thus opening port 30 to the atmosphere, and the consequent reduction of pressure in the tilting cylinder allows the tilting piston 22 to descend and the body 1 to assume its load-carrying position again. During this uprighting movement of the body the end of the dog 6 is kept pressed against the concave surface of the quadrant 4 by the effort of the spring 16, and the concave surface slides under the end of the dog 6 until the shoulder 5 passes under the dog. Then the action of the tension spring 16 pulls the wrist-plate 10 around so as to bring the locking members to the locking position shown, except the latch 19, which is brought to the locking position by its own weight or by a spring operating directly upon it.

Although the two-piston valve shown has pistons of different diameters, pistons of the same diameter may be used. When the two pistons are of the same diameter they will descend on account of their own weight, which may be aided by the pressure of the latch against the top of the piston rod 29. It may be observed that even if the latch 19 is removed from the locking device, the remaining members will still lock the body in its load-carrying position. This is because the three pins, 12, 13 and 14, are kept in line with each other while the device is locked, as has been described.

In Figs. 3 and 4 the mechanism on one side of a vertical median plane through the axis of the hinge-pin 54 is a duplicate of that on the other side of this plane. Each of the duplicate members is hereinafter designated as "right" or "left" according to its position to the right or left of the median plane. Each of the tilting cylinders 35 and its piston 36 operate in the same manner as the corresponding cylinder and piston in Fig. 1, but each cylinder 35 is long enough to allow movement of its piston for tilting the body 53 toward either side. The differential valves 57 are of the same nature as the one in Fig. 1 and operate in the same manner as the valve in Fig. 1, but each of the piston rods has added to it a head 60, and each of the valve casings 37 has a boss added to it in order that the corresponding safety pawl 56 may be attached, and each valve casing is also tapped with two threaded holes partly through the wall to receive the two hinge-screws 52. It is understood that the tilting cylinders and the differential valves are rigidly fastened to the draft-sill 47 by suitable means. The right compression spring 44 acts to force the right wrist-plate 38 clockwise around the right shaft 71 until the rotation of the wrist-plate is stopped by the reach-rod 39 striking it. The spring 44 abuts against the draft-sill 47 and against the shoulder on the rod 72, which slides freely through the spring and the draft-sill, and is rotatively connected to the wrist-plate 38 by means of the pin 69. The quadrant 46 has the locking shoulder 42 duplicated on the opposite side of the car. The right latch 48 and the right rocker-arm 49 are rigidly connected together by the right shaft 70, which is rotatably supported by a bracket on the draft-sill 47. The left rod 50 and the left swivel block 55 connect the lower end of the right rocker-arm 49 to the left yoke 51, which is hinged to the cylinder of the left differential valve 37 by means of two coaxial screws 52. The body of the push-pin 59—62 fits loosely in a hole through the crown of the yoke 51. The head 62 prevents the pin from dropping through the hole. The rod 50 passes loosely through a hole in the swivel block 55, which is swivelly connected to the yoke 51. The compression spring 58 abuts against the swivel block 55 and against the collar 65 (see Fig. 5) on the rod 50. The pin 66 in the rod 50 acts as a stop to prevent the spring from forcing the block off the rod. The safety pawl 56 is hinged to the differential valve cylinder 37 by means of the pin 63 (see Fig. 5), and the compression spring 57 forces the pawl to the position shown in Fig. 5, so that the pawl will engage the under side of the head 60 of the piston rod when the latter begins to descend from the position shown by broken lines. Movement of the rod 50 toward the left from its position in Fig. 5 presses the end of the rod against the wing 64 of the pawl 56 and forces the pawl back from the position in which it can engage with the head 60 of the piston rod. The locking mechanism on the side of the car toward which the body 53 is tilted remains in its locking position during the entire operation of tilting and uprighting the body.

The operation of the device of Figs. 3, 4, 5 and 6 is as follows: When the body 53 is locked in its load-carrying position, as in Fig. 3, the yokes 51 are both held vertically upright and the two pawls 56 are both held pushed back from their engaging positions relative to the heads of the piston rods of the differential valves. When compressed air is admitted through the right control port 67 to the under side of the lower piston of the right differential valve 37, the consequent upward movement of the right differential pistons and their rod forces the right push-rod 59—62 upward so that the latter lifts the right latch 48 to the position shown in Fig. 4, and at the same time rotates the right wrist-plate 38 out of its dead-center position, as has been described. This lifting of the right latch 48 rocks the left yoke 51 toward the right and allows the left pawl 56 to move to its engaging position, as shown in Fig. 4. The upward movement of the right differential valves also admits compressed air from the right pipe 31ᵃ to the right pipe 43 and thence under the right tilting piston 36, so that the latter is forced upward and causes the body 53 to tilt toward the left by means of the right connecting rod 68. Now exhausting the air through the right control port 67 allows the right differential pistons and the right push-pin 59 to descend to their lower position, and the right latch 48 to drop until its locking shoulder, corresponding to 18 of Fig. 1, rests on the convex surface of the right wrist-plate 38. This dropping of the right latch 48 rocks the left yoke 51 toward the left to the position shown in Fig. 5, in which position the left yoke is held, by means of the movable members which connect the left yoke to the right latch, as long as the locking shoulder of the right latch rests on the convex surface of the right wrist-plate 38. The next step in the operation is to admit compressed air through the left control port 67 under the lower piston of the left differential valve 37, so as to cause the left differential pistons to move upward and admit compressed air under the left tilting piston 36, in order to upright the body 53 to its load-carrying position. As soon as the piston rod of the left differential valve reaches its highest position, as shown by broken lines in Fig. 5, the left pawl 56 snaps under the head of the piston rod. The left locking mechanism is not affected by the movement of the left piston rod, since the left push-pin 59, on the uprighting side of the car, is held away from over the piston rod 61, on account of the right latch 48 still being held up from its locking position by its locking shoulder still resting on the convex surface of the right wrist-plate 38, which has not yet rotated to its locking position. As soon as the body 53 is uprighted to its load-carrying position, the right locking mechanism is forced back to its locking position by the right compression spring 44, which forces the wrist-plate 38 around to the position shown in Fig. 3. The right latch then drops to the locking position shown in Fig. 3, and by doing so moves the left rod 50 to its extreme left position, during which movement the rod forces the left pawl 56 back from its engaging position, thus leaving the left piston rod and its pistons mechanically free to descend. The last-mentioned movement of the left rod 50 also rocks the left yoke 51 toward the left until the side of the lower end of the push-pin 59—62 strikes against the side of the piston rod 61 and stops the yoke in the corresponding inclined position, after which the remainder of the said movement of the rod 50 compresses the spring 58. As soon as the left piston rod descends to its lowest position, the left yoke 51 is forced to its vertical position by the expansion of the left spring 58. The left control port 67 may be opened to release the compressed air from under the lower left differential piston either before or after the left pawl 56 has been moved out of its position in which it can engage the head 60 of the left piston rod, but should not be opened to release before enough compressed air is admitted to the left tilting cylinder 35 to completely upright the car body.

The safety feature of the device just described is that it cannot be operated so as to cut off the compressed air from the uprighting cylinder until after the car body is securely locked against tilting toward that cylinder. This is because the pushing back of the safety pawl 56 to its non-engaging position depends upon the secure locking of the unlocked mechanism on the opposite side of the car. The latch 48 must drop far enough to securely lock the corresponding wrist-plate 38 in order to give the rod 50 sufficient movement toward the pawl 56 to push the latter back to its non-engaging position clear of the head of the differential-valve piston rod 61. If the latch 48 fails to drop far enough to securely lock the wrist-plate 38, then the corresponding amount of movement given to the rod 50 is not sufficient to push the safety pawl 56 back clear of the head of the piston rod; consequently, the safety pawl, even though pushed part way back toward its non-engaging position, as in the case of insecure locking, will still prevent the piston rod 61 and its pistons from descending as they would simultaneously with the escape of compressed air from under the lower differential piston if the safety pawl were pushed back far enough to clear the piston-rod head. On account of the differential pistons being thus held in their upper position by the safety pawl in case of insecure locking, or of no locking at all, the uprighting cylinder is still kept in communication with the compressed air supply after the escape of compressed air through the control pipe 67 and as long as the condition of insecure locking continues. Compressed air is thus maintained in the uprighting cylinder and prevents the load-carrying body from tilting in the direction against which it is not securely locked.

Figure 7:
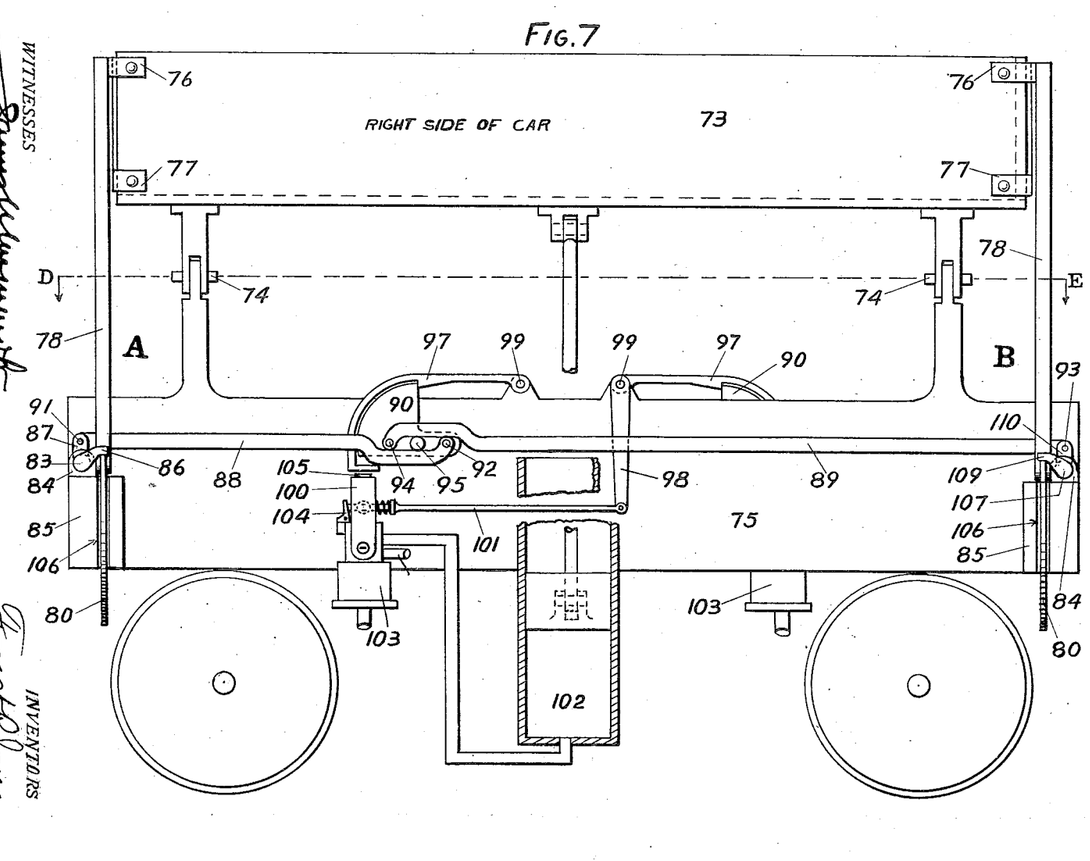
Fig. 7 is a side view, partly in elevation and partly in section, of the frame and body of a dump-car whose body is provided with hinged side members which automatically open in a usual manner to allow the load to discharge and equipped with the improved locking, safety and interconnecting devices in duplicate and so applied as to lock the sides of the body closed at the same time that the locking of the body in the load-carrying position occurs. In addition, the car has duplicate differential valves of the form shown in Figs. 3, 4, 5 and 6, and duplicate tilting cylinders of the usual form. Part of one of the tilting cylinders is shown in axial section and part of it is broken away to give a clear view of the adjacent arm and rod, both of which would otherwise be partly hidden; the other tilting cylinder is on the opposite side of the sill, directly opposite and hidden by the cylinder shown.
Figure 8:
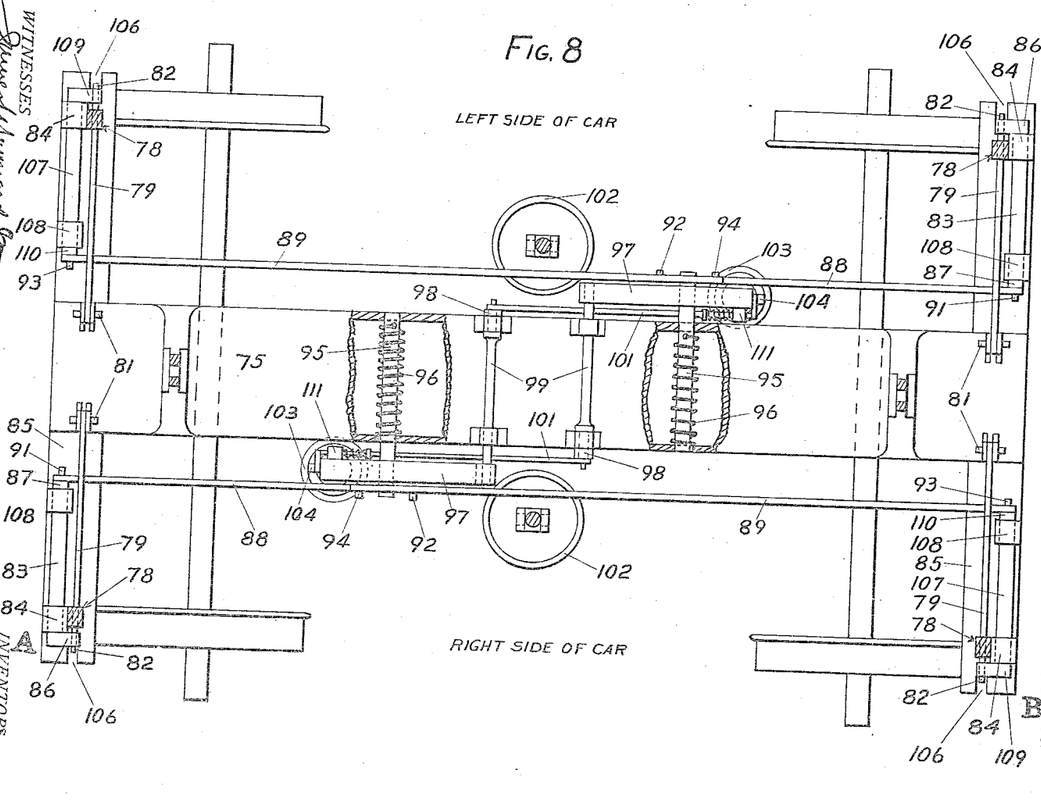
Fig. 8 is a horizontal section of Fig. 7 on the plane D—E, together with a plan of the parts wholly below the plane of this section, and with a portion of the sill broken away to expose parts of the locking mechanism clearly.
Figure 9:
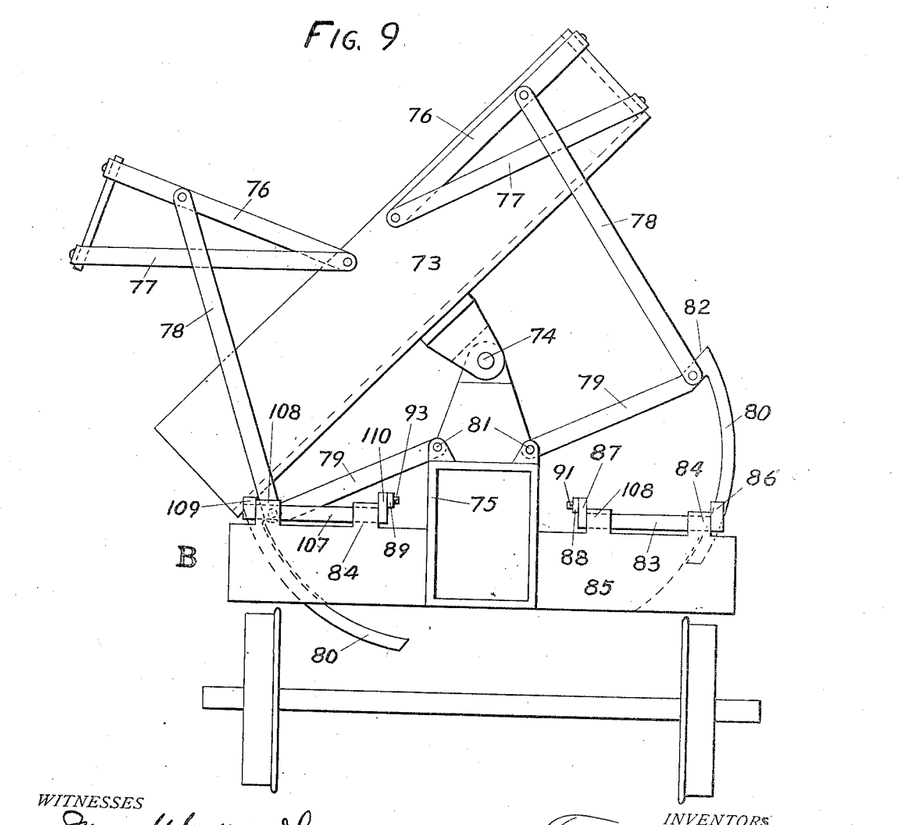
Fig. 9 is an end elevation of the members at one end of the car shown in Figs. 7 and 8, but with the body tilted and one of its sides raised to discharge the load.

In Figs. 7, 8, and 9, one side of the car is a duplicate of the other side, and all of the tilting and locking mechanism is symmetrically located with reference to a vertical line through the center of the car. The tiltable body 73 is supported by the hollow draft-sill 75 to which the body is connected by the hinge-pins 74. The articulated members, 76, 77, 78 and 79, comprise the means for opening the side of the car body, and operate in the manner usual to such mechanism. On the right side of Fig. 9 the member 79 is shown lifted to the position it occupies while the body 73 is fully tilted toward the left. The member 79 has a quadrant 80 whose center of curvature is in the axis of the hinge-pin 81 which articulates 79—80 to a bracket that is an integral part of the draft-sill 75. The shoulder 82, at the upper end of the quadrant, takes a horizontal position when the quadrant is swung down to its lowest position, corresponding to the left quadrant as shown in all three of the figures. At the corner B of the car, the shaft 107 of the dog-shaft 107—109—110 is rotatably supported by the brackets 84 and 108, which are integral with the cross-sill 85 of the car frame. When this dog-shaft is in its locking position, as shown, its arm 109 extends over the shoulder at the top of the quadrant 80 so as to hold the member 79—80 down, thus preventing the body 73 from tilting toward the opposite side, and at the same time locking the corresponding movable side door of the body in its closed position. The curved portion 80 of the quadrant member 79—80 moves in a slot 106 in the corresponding end of the cross-sill 85. The sides of this slot prevent the quadrant from springing away from the dog-shaft crank 109. The dog-shaft crank arm 110 at the corner B of the car is connected to the right wrist-plate 90 by means of the reach-rod 89, the crank-pin 93, and the wrist-pin 94. The dog-shaft crank 87 at the corner A of the car is connected in a corresponding manner to the same wrist-plate 90 by means of the reach-rod 88, crank-pin 91, and wrist-pin 92. Except that one of these dog-shafts is right-handed and the other left-handed, they are alike and operate in the same manner. The right reach-rods 88 and 89 hold the corresponding right dog-shafts in the locking position as long as the right wrist-plate 90 remains in the position in which it is shown. The right wrist-plate 90 is rigidly fastened to the corresponding shaft 95, which is rotatably supported by the draft-sill 75. Rocking the right wrist-plate 90 clockwise around its shaft 95 (in Fig. 7) moves the dog-shafts at the corners A and B to the unlocking position. Around the shaft of the right wrist-plate is coiled a torsion spring 96, one end of which is inserted in a hole in the draft-sill 75, and the other end in a hole in the shaft. This spring acts to rotate the right wrist-plate counter-clockwise (in Fig. 7), and the right reach-rods 88 and 89 stop this rotation when they strike each other or the projecting end of the shaft 95 on which the wrist-plate is mounted. The left wrist-plate latch 97 is rigidly connected to the right rocker-arm 98 by means of the corresponding shaft 99, which is rotatively journaled in brackets that are integral with the draft-sill 75. On the right side of the car, the rod 101 is articulated to the lower end of the rocker arm 98 and passes through the swivel block 111 which is rotatably connected to the yoke 100. The yoke 100, swivel blocks 111, safety pawls 104, push-pins 105, differential valves 103, and the tilting cylinders 102 are similar to and operate in the same manner as the corresponding members of Figs. 3, 4, 5 and 6; also each of the remaining members of the locking and tilting mechanism of Figs. 7, 8 and 9 is similar to and operates in the same manner as the corresponding member of Figs. 3, 4, 5 and 6. Only the right side of the mechanism unlocks for tilting the car body toward the left, and vice versa. Although no rigid supporting means connecting the differential valve casings and the tilting cylinders to the draft-sill are shown, it is understood that such means are used.

An entire train of dump-cars such as have been described can be dumped and uprighted by an operator who remains at one place during the operation, provided the air-pipe systems of the cars are connected to suitable train lines of air-pipes. In the usual methods of operating dump-cars than can be dumped either to the right or left at will as a train, three train lines of air-pipe are used, one of which is generally the air-brake line, and the other two are control lines. By the use of an air-operated reversing valve on each car, as hereinafter described, one of these control lines is eliminated, thus leaving only two train lines of air-pipe and the entire train can still be dumped by the operation of only one control valve even though the brake-line pipes of the cars are not connected together, or are otherwise rendered inoperative.

Figures 10, 11:
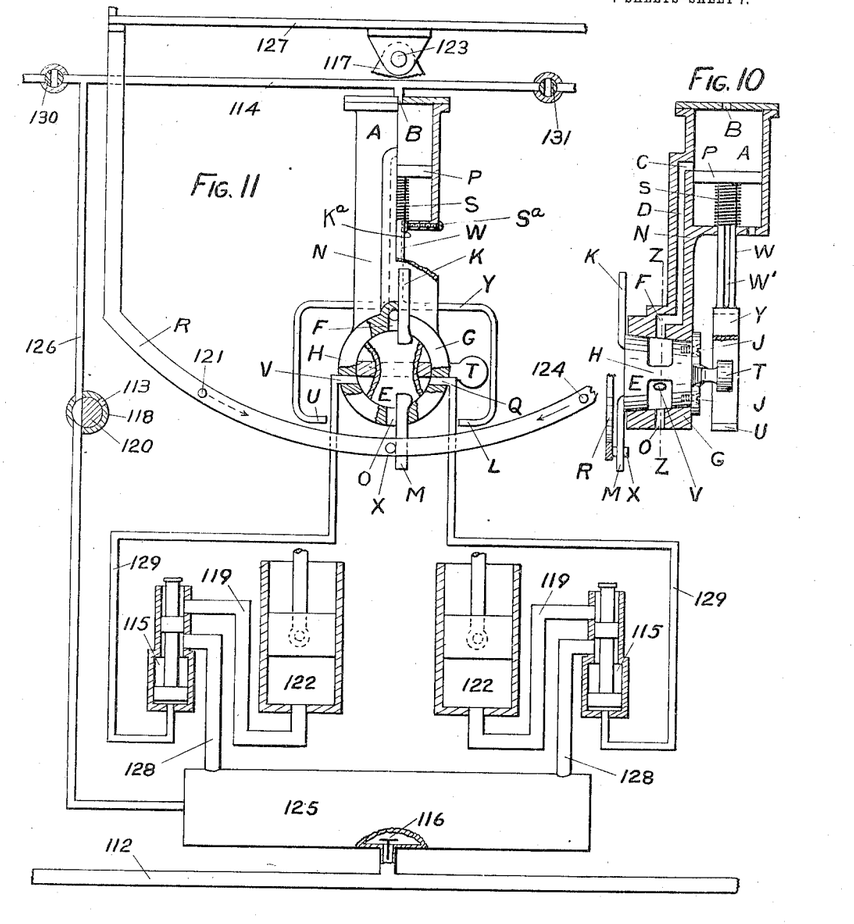
Fig. 10 shows an improved reversing valve, together with a valve-setting piston and its attached yoke, the latter partly broken away at the front, and also together with a sectional view of the valve-casing, of the cylinder which incloses the piston, and of the frame which connects the valve-casing and cylinder together, the section being on a plane through the axes of the valve and cylinder.
Fig. 11 shows the end elevation of a fragment of a load-carrying body tiltable toward either side, to which is attached a quadrant for operating the reversing valve of Fig. 5, together with the corresponding view of the reversing valve and a diagram of an air-pipe system for the two-way tilting devices of Figs. 3, 4, 7 and 8. The reversing valve is shown partly in elevation as seen when looking toward the right at Fig. 10, with parts of the valve-plug and its casing broken away as far down as the plane Z—Z of Fig. 10, and with the cylinder in half section on an axial plane parallel to the plane Z—Z. A portion of the frame between the valve-casing and cylinder is broken away with the removed portion of the cylinder. The tilting cylinders and the differential-valve casings are shown in axial section.
Figure 12:
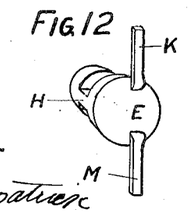
Fig. 12 is a perspective view of the valve-plug of Fig. 10.

Referring to both Figs. 10 and 11 so far as the members indicated by reference letters are concerned, but only to Fig. 11 with regard to members referred to by numerals, the cylinder A has the port B for the admission of compressed air from the control system, and the port C which is connected by the duct D to the port F in the casing G of a reversing valve whose plug E has the form of a cone frustum whose middle portion is cut away on opposite sides so as to leave the web H. This valve-plug is shown in Fig. 12 separately. The cylinder A and the valve casing G are integral with the frame N which connects them together. The arms K and M are integral with the valve-plug E at its large end. The arm T is rigidly fastened to the small end of the valve-plug E by means of the screws J. The valve-setting piston P is rigidly connected to the yoke Y—U—L by means of the piston rod W, which is integral with the yoke and has a keyway W' that engages with a key K$^a$ in the lower head of the cylinder A so as to prevent rotation of the piston rod and the yoke relative to the cylinder A. The key K$^a$ is held in place by means of the screw S$^a$ whose cylindrical end enters a hole in the key. The coiled compression spring S around the piston rod W, abuts against the piston P and the lower head of the cylinder A. The quadrant R is fastened rigidly to the car body 127, and has three pins, 121, X, and 124, all projecting from the same side of the quadrant. The car body 127 is hinge-connected, by means of the pin 123, to the bracket 117. The tank 125 stores air received from the air-brake train line of pipe 112 through the check-valve 116, which prevents the return of air from the tank to the air-brake line. The differential valves 115 and the tilting, or dumping, cylinders 122 are similar to those hereinbefore described as used in duplicate on a two-way dumping car.

It is understood that, in Fig. 11, the hinge bracket 117, the frame N of the reversing valve, the differential valves 115, the tilting, or dumping, cylinders 122, and the receiver tank 125, are all rigidly fastened together by a frame such as that of a dump-car, and that the piston of the left dumping cylinder 122 is suitably connected to the left side of the car body 127; also that the piston of the right cylinder 122 is likewise connected to the right side of the car body.

Figure 13:
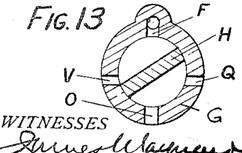
Fig. 13 is a section of Fig. 10 on the plane Z—Z, but with the valve-plug rotated to a position different from that of Figs. 10 and 11.

The operation of the reversing valve in connection with the other members shown in Fig. 11, will first be described for a car that is cut off from the remainder of the train. Of the complete train line of dump-control air pipe, the section 114 belongs to one car. In this section, 114, the valves 130 and 131, near the ends of the section, are kept closed, as shown, while operating the car as an individual unit, and compressed air for the control is taken from the storage tank 125 through the pipe 126 which connects the storage tank to the control pipe 114. The 130 reversing valve-plug E and the valve-setting piston P are each shown in the position it occupies just after the car body 127 has been uprighted after dumping to the right side, but before the manually operated control valve 118 has had its plug 120 rotated to cut off air communication between the storage tank 125 and the cylinder A. When the reversing valve-plug E is in the position shown in Figs. 10 and 11 there is no passage for compressed air from the tank 125 through the reversing valve. As long as the valve-plug 120 of the control valve is left in the position shown, the compressed air thus admitted to the cylinder A holds the valve-setting piston P down in the position shown, against the resistance of the compression spring S. Rotating the control valve-plug 120 through one-quarter of a revolution clockwise establishes air communication between the two upper ports in the valve casing 118, thus allowing the compressed air to escape from the cylinder A to the atmosphere. During this escape of air, the compression spring S forces the valve-setting piston P upward, together with the piston rod W and the yoke Y—U—L, until the piston reaches the top of its cylinder A. During the first stage of this upward movement, the yoke-hook L moves upward far enough to make contact with the under side of the free end of the reversing arm T, and during the latter stage of the movement, the hook L lifts the end of the arm T so as to turn the valve-plug E through about one-eighth of a revolution counter-clockwise, thus setting the reversing valve-plug in the position for dumping the car to the right. When the reversing valve is thus set, the position of the valve-plug web is as shown in Fig. 13. Now by rotating the control plug 120 back to the position shown in Fig. 11, compressed air is admitted to the cylinder A to force the valve-setting piston P down to the position in which it is shown. While the piston P is thus moving downward it passes over and then uncovers the port C, thus allowing the compressed air to pass on through the cylinder A and down into the bottom of the left differential valve 115. The path of the air from the cylinder A is through the port C, duct D, port F, port V, and the left pipe 129 which connects port V to the bottom of the left differential valve 115. The compressed air thus admitted to the bottom of the left differential valve 115 forces its pistons and piston rod upward so as to admit air to the bottom of the left dumping cylinder 122 from the storage tank 125 through the left pipes 128 and 119, thus causing the piston in the left dumping cylinder to rise and tilt the car body 127 toward the right.

Figure 14:
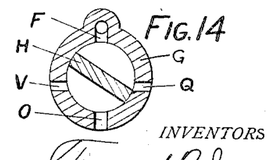
Fig. 14 is the same section as Fig. 13, but the valve-plug is rotated to a position different from those of Figs. 10, 11 and 13.

As the car body 127 tilts toward the right, moving the quadrant R accordingly in the direction of the solid-line arrow on the quadrant, the quadrant pin 124 strikes the arm M of the reversing valve-plug E and pushes this arm around so as to turn the valve-plug E clockwise through about one-quarter of a revolution thus setting the valve-plug E so that its web H is left in the position shown in Fig. 14. The latter position of the reversing valve-plug allows the compressed air to escape from the bottom of the left differential valve 115 through the ports V and O of the reversing valve to the atmosphere, and also allows compressed air to flow from the reversing valve through the port Q and right pipe 129 to the bottom of the right differential valve 115. In consequence of this action, the pistons of the left differential valve 115 descend and the pistons of the right differential valve 115 are forced upward. Compressed air is thus allowed to escape to atmosphere from the left dumping cylinder 122, and is admitted to the right dumping cylinder 122 from the storage tank 125 to upright the car body. As the car body uprights, the middle pin X, in the quadrant R, strikes against the side of the valve-arm M and moves this arm and the reversing valve-plug E from the position of Fig. 14 to the position shown in Figs. 10 and 11. The latter position of the reversing valve-plug E allows the compressed air to escape from the bottom of the right differential valve 115 through the ports Q and O, thus allowing the pistons in the right differential valve 115 to descend and let the compressed air escape from the right dumping cylinder 122.

The plug 120 of the control valve can either be left in the position shown until the car is to be dumped again, or it can be turned to the position to let the compressed air escape from the cylinder A through the pipe connections between this cylinder and the control valve 118, thus allowing the valve-setting piston P to move upward and set the reversing valve-plug E in its position for dumping the car toward the right again.

If the car is to be dumped to the left, the reversing valve-plug E must be turned counter-clockwise by hand so as to bring the arm K below the valve-plug, and the arm M above the plug. The quadrant R then moves in the direction indicated by the broken-line arrow on it as the car body tilts toward the left, and the quadrant pins 121 and X strike and move the arm K successively toward the right and left as the car body is tilted and uprighted, but the quadrant pin 124 performs no function during this operation.

When a double-tilting car provided with a reversing valve is coupled to the other cars of a train in which all of the air-brake pipe sections 112 are coupled together to form a complete train line of air-brake pipe, and all of the control pipe sections 114 also coupled together to form a complete train line of control pipe, then the valves 130 and 131 in the control line are set in the open position and the valve-plug 120 is set in the position to close both pipe ends at the valve 118, which position is one-half a revolution from that shown. The valve 118 on any car can then be used to control the dumping of all of the cars of the train substantially in unison. The single operation of opening any one of the control valves 120 causes all of the cars of the train to dump, upright and relock in the load-carrying position. If there is an air compressor connected to the control pipe line, a valve in the connection between the compressor and the control pipe line can be similarly used to control the dumping. But if the air-brake train-line sections are not coupled together or are otherwise rendered inoperative, all of the cars of the train can still be caused to dump, upright and relock in the load-carrying position by the single operation of opening the valve between the compressor and the train line of control air-pipe. In order to operate under this condition, the control valve-plug 120 is set to the position shown, and the valves 130 and 131 are both set open.

Since a drawing showing the air-supply and control systems in connection with the dumping, locking, unlocking and safety means would be too complicated for clearness, no such drawing is presented. The drawings which are presented are believed to clearly indicate how all of the said parts can be built together in one structure.

We claim:

1. A dump-car comprising locking, tilting and uprighting means and adapted to be coupled to similar cars to form a train having only one train line of air control pipe in addition to the usual air-brake train line of pipe, in which train each car thus coupled is caused to automatically unlock, tilt, upright and relock the car body in its load-carrying position by the single manual operation of admitting compressed air to said line of control pipe, all of the cars thus coupled together operating substantially in unison.

2. In a pneumatically operated mechanism, the combination of a supporting frame, a load-carrying body tiltably mounted on said frame, means to lock said body in a load-carrying position, means to unlock said locking means, means for tilting said body, means for uprighting said body, and safety means to cause said uprighting means to maintain said body against tilting toward said uprighting means in case of insecure locking.

3. In a locking device the combination of locking means, a pneumatic cylinder and piston, and a differential valve adapted to unlock said locking means and afterward admit compressed air to said cylinder.

4. In a locking device, the combination of a wrist-plate, a stop for limiting the rotation of said wrist-plate, a spring for pressing said wrist-plate against said stop, and a latch for locking said wrist-plate against said stop.

5. In a pneumatic dump-car, a lock and unlocking means on the right side, a lock and unlocking means on the left side, and means connecting the right lock to the left unlocking means and adapted to render the left unlocking means inoperative as to unlocking the left lock while the right lock is not locked.

6. In a tilting device, the combination of a reversing valve and means to rock the plug of said valve from an initial position to a reverse position and means to rock the plug to a position intermediate between said initial and said reverse positions.

7. The combination of a supporting frame, a load-carrying body tiltably mounted on said frame, a quadrant connected to said body so that said body and said quadrant move in unison when said body is tilted and uprighted, a dog-shaft whose dog engages a shoulder on said quadrant to retain said body in a load-carrying position, a differential valve, a wrist-plate locking device operated by said valve, and means connecting said locking device to the crank of said dog-shaft.

8. The combination of a supporting frame, a load-carrying body tiltably mounted on said frame, a wrist-plate, a stop for limiting the rotation of said wrist-plate, a latch for locking said wrist-plate against said stop, and means connected to said wrist-plate and adapted to retain said body in a load-carrying position while said wrist-plate remains in said locking position.

9. The combination of a supporting frame, a load-carrying body tiltably mounted on said frame, a wrist-plate, a stop for limiting the rotation of said wrist-plate, a latch for locking said wrist-plate against said stop, means connected to said wrist-plate and adapted to retain said body in a load-carrying position while said wrist-plate remains in said locked position, a cylinder and piston for tilting said body, and a differential valve whose movement due to air pressure from a control source first forces said latch out of its locking position, then rocks said wrist-plate so as to cause disengagement of said means for holding said body in a load-carrying position and to leave said body free to tilt, and finally opens a port to admit compressed air to said cylinder.

10. The combination of a supporting frame, a load-carrying body tiltably mounted on said frame, a quadrant connected to said body so that said quadrant and said body move in unison while said body is being tilted and uprighted, a wrist-plate, a stop for limiting the rotation of said wrist-plate, a spring for rotating said wrist-plate against said stop, a latch for locking said wrist-plate against said stop, a dog-shaft whose dog is adapted to engage said quadrant and whose crank is adapted to connection to said wrist-plate, means connecting said crank to said wrist-plate in a manner to cause said dog to engage said quadrant to hold said body in a load-carrying position while said wrist-plate remains in its locked position, a cylinder and piston for tilting said body, a differential valve whose movement due to air pressure from a control source first forces said latch out of its locking position, then rocks said wrist-plate so as to cause the disengagement of said dog from said quadrant thus leaving the body free to tilt, and finally opens a port to admit compressed air to said cylinder.

11. In a locking device, the combination of a wrist-plate, a stop for limiting the rotation of said wrist-plate, a spring for pressing said wrist-plate against said stop, a latch for locking said wrist-plate against said stop, and a differential valve whose movement, caused by air pressure from a control pipe line, first forces said latch out of its locking position, then rocks said wrist-plate through a portion of a revolution, and finally opens a port to allow compressed air from another pipe line to flow through said differential valve.

12. In a locking device, the combination of a wrist-plate, a stop for limiting the rotation of said wrist-plate, a spring for pressing said wrist-plate against said stop, a latch for locking said wrist-plate against said stop, a pneumatic cylinder and piston, and a differential valve whose movement, caused by air pressure from a control source, first forces said latch out of its locking position, then rocks said wrist-plate through a portion of a revolution, and finally opens a port connected to said cylinder.

13. In a tilting device, the combination of a reversing valve, means to rock the plug of said valve from an initial position to a reverse position and then to a position intermediate between said initial and said reverse positions, and means to then rock the plug to its initial position again as compressed air is released from said latter means.

14. In a dump-car, the combination of a supporting frame, a load-carrying body tiltably mounted on said frame, means to tilt said body, means to control the admission of compressed air to said tilting means, means to upright said body, means to control the admission of compressed air to said uprighting means, a reversing valve, means to set said reversing valve to the position in which it admits compressed air to said control means of said tilting means, and means which set said reversing valve to the position in which it allows the escape of compressed air thus admitted and admits compressed air to said control means of said uprighting means, and which then set said reversing valve to a position which allows the escape of the compressed air thus admitted to said control means of said tilting means.

15. In a dump-car, the combination of a differential valve on the right side of said car, a differential valve on the left side of said car, a reversing valve connected to said differential valves by a separate air duct to each, and also connected to a source of compressed air, means to set said reversible valve to a position to admit compressed air to said right differential valve, and means to set said reversing valve to a position to allow the compressed air thus admitted to escape while compressed air from said source is admitted to said left differential valve, and then to set said reversing valve in the position which allows the escape of the compressed air thus admitted to said left differential valve.

16. In a pneumatically operated mechanism, the combination of a supporting frame, a load-carrying body tiltably mounted on said frame, means to lock said body in a load-carrying position, means to tilt said body, means whose movement unlocks said locking means and afterward causes said tilting means to tilt said body, means to upright said body, and means to cause said uprighting means to maintain said body against tilting toward said uprighting means in case of insecure locking.

17. In a pneumatically operated mechanism, the combination of a supporting frame, a load-carrying body tiltably mounted on said frame and having a movable side, means to open said side as said body tilts, means to lock said body and said side in a load-carrying position, means to unlock said locking means, means for tilting said body, and safety means to cause said uprighting means to maintain said body against tilting toward said uprighting means in case of insecure locking.

18. In a pneumatically operated mechanism, the combination of a supporting frame, a load-carrying body tiltably mounted on said frame and having movable sides, means to open one of said sides as said body tilts, means whose movement unlocks said locking means and afterward causes said tilting means to tilt said body, means to upright said body, and means to cause said uprighting means to maintain said body against tilting toward said uprighting means in case of insecure locking.

19. In a locking device, the combination of a wrist-plate, a stop for limiting the rotation of said wrist-plate, a spring for forcing said wrist-plate against said stop, and a valve whose movement, caused by compressed air from a control pipe line, rotates said wrist-plate away from said stop and afterward allows compressed air from another pipe to flow through said valve.

20. A reversing valve comprising a rotary valve-plug having arms rigidly attached thereto, a valve-casing having a multiplicity of ports and bored to receive said valve-plug, a pneumatic cylinder integral with said valve-casing, a duct connecting the bore of said cylinder to one of the ports of said valve-casing, a port in each head of said cylinder, a piston and piston rod in said cylinder, a yoke integral with said piston rod and adapted to engage one of the arms of said valve-plug, and a spring between said piston and one of the heads of said cylinder.

21. In a dump-car, tilting means, a lock and unlocking means on the right side, uprighting means, a lock and unlocking means on the left side, means connecting said right lock to said left unlocking means and adapted to render said left unlocking means inoperative in so far as unlocking said left lock is concerned throughout the time said right lock is not locked, and safety means to cause said uprighting means to maintain the car body against tilting toward said uprighting means in case of insecure locking.

Signed this tenth day of September in the presence of two witnesses.

FORREST R. JONES.
ADOLPH BUENZLI.

Witnesses:
JAMES MAYNARD, Jr.,
WILL M. HOUSE.